United States Patent
Mantel

(10) Patent No.: US 6,688,034 B1
(45) Date of Patent: Feb. 10, 2004

(54) FISH HOOK REMOVER

(76) Inventor: Robert Mantel, W141 N9350 Fountain Blvd., Menomonee Falls, WI (US) 53005

( * ) Notice: Subject to any disclaimer, the term of this patent is extended or adjusted under 35 U.S.C. 154(b) by 0 days.

(21) Appl. No.: 10/357,755

(22) Filed: Feb. 4, 2003

Related U.S. Application Data

(60) Provisional application No. 60/396,291, filed on Jul. 17, 2002.

(51) Int. Cl.⁷ .............................................. A01K 97/00
(52) U.S. Cl. ........................................................ 43/53.5
(58) Field of Search ........................................... 43/53.5

(56) References Cited

U.S. PATENT DOCUMENTS

| | | |
|---|---|---|
| 1,728,864 A | 9/1929 | Kramer |
| 3,869,822 A | 3/1975 | Itieman ...................... 43/53.5 |

Primary Examiner—Robert P. Swiatek
Assistant Examiner—Bethany L Griles
(74) Attorney, Agent, or Firm—Donald J. Ersler

(57) ABSTRACT

A fish hook remover includes a lengthwise base member, a combination handle, an actuation rod, and a rotary arm. The combination handle is attached to one end of the lengthwise base member and a yoke is formed on the other end of the lengthwise base member. The actuation rod is slidably retained by the lengthwise base member. A knob is attached to one end of the actuation rod and a rack is formed on the other end of the actuation rod. The rotary arm includes two rotating bodies and a pinion gear rigidly attached to the two rotating bodies. A clearance area is formed between the two rotating bodies to receive a shank of a hook. The rotary arm is pivotally retained by the yoke. The fishing line is wrapped around the combination handle. Linear movement of the actuation rod causes the pinion and rotary arm to pivot.

13 Claims, 4 Drawing Sheets

FISH HOOK REMOVER

CROSS-REFERENCES TO RELATED APPLICATIONS

This is a utility patent application, taking priority from provisional patent application, Ser. No. 60/396,291 filed on Jul. 17, 2002.

BACKGROUND OF THE INVENTION

1. Field of the Invention

The present invention relates generally to fishing accessories and more specifically to a fish hook remover, which strips a fish hook out of a fish's mouth.

2. Discussion of the Prior Art

There are at least two patents which disclose a fish hook extractor, which use a pivoting arm to remove a hook from a fish's mouth. U.S. Pat. No. 1,728,864 to Kramer discloses a fishhook disgorger. The fishhook disgorger includes a pivoting arm which is placed inside a hook and pivoted by pulling a lever pivotally connected to a parallelogram assembly. U.S. Pat. No. 3,869,822 to Tieman discloses a fishhook extractor. The fishhook extractor includes a pivoting arm which is placed inside a hook and pivoted by squeezing a knob and handle together to rotate the pivoting arm. However, neither of the above fish hook extractors include structure for retaining the fishing line, when the attempted removal of the fish hook is occurring.

Accordingly, there is a clearly felt need in the art for a fish hook remover which retains the fishing line while the fish hook is removed with a rotary arm.

SUMMARY OF THE INVENTION

The present invention provides a fish hook remover that retains the fishing line while the fish hook is being removed. The fish hook remover includes a lengthwise base member, a combination handle, an actuation rod, and a rotary arm. The combination handle is attached to one end of the lengthwise base member and a yoke is formed on the other end of the lengthwise base member. The actuation rod is slidably retained by the lengthwise base member. A knob is attached to one end of the actuation rod and a gear rack is formed on the other end of the actuation rod. An opening is formed through the lengthwise base member between each ear of the yoke to expose the gear rack.

The rotary arm includes a first rotating body, a second rotating body, a drive shaft, and a pinion gear. The first and second rotating bodies preferably have a semi-circular shape. The first rotating body is attached to one end of the drive shaft and the second rotating body is attached adjacent the first rotating body on the drive shaft such that a clearance area is formed therebetween for the insertion of a fish hook. A male drive profile is formed on the other end of the drive shaft to receive the pinion gear.

The pinion gear includes a female drive profile which is sized to receive the male drive profile. The pinion gear mates with the rack formed on the other end of the actuation rod. The pinion gear is retained between two ears of the yoke. The drive shaft is inserted through the pinion gear and both ears of the yoke. A retention device is attached to the other end of the drive shaft to retain the rotary arm, axially relative to the ears of the yoke.

A spring is preferably slipped over the actuation rod and retained between the knob and the combination handle. In use, the clearance area is slipped over the fish hook and pushed as close as possible to a bight of the fish hook. The fishing line is wrapped around the combination handle and the actuation rod is depressed; the rack causes the pinion on the rotary arm to pivot at least 90 degrees; and pivoting of the rotary arm pushes the flesh of the fish off the barb of the hook.

Accordingly, it is an object of the present invention to provide a fish hook remover that retains a fishing line, while a rotary arm is striping a hook from the mouth of a fish.

Finally, it is another object of the present invention to provide a fish hook remover that includes a rotary arm that pivots over 90 degrees.

These and additional objects, advantages, features and benefits of the present invention will become apparent from the following specification.

DETAILED DESCRIPTION OF THE PREFERRED EMBODIMENTS

Figures 1, 2:
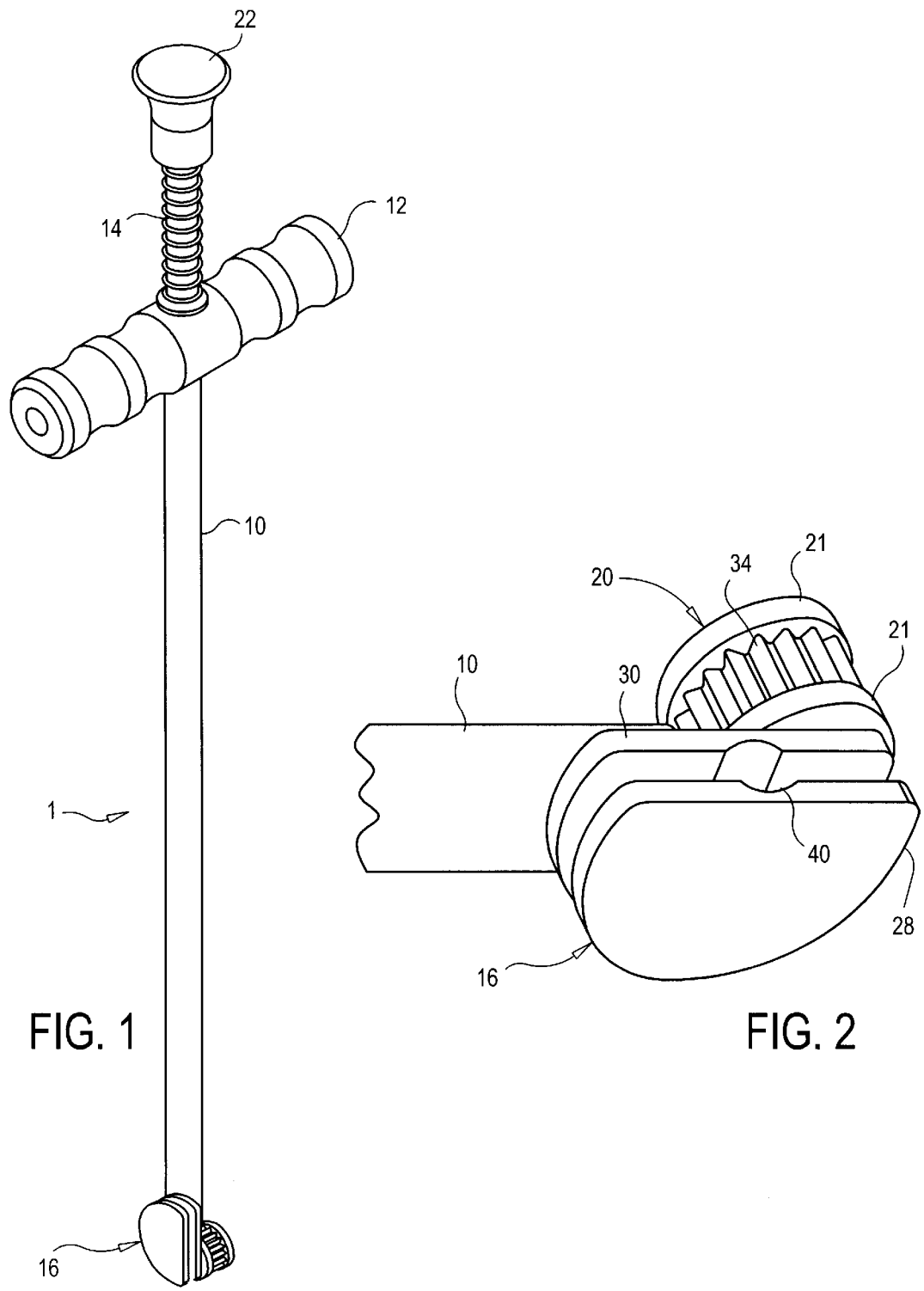
FIG. 1 is a perspective view of a fish hook remover in accordance with the present invention.
FIG. 2 is an enlarged perspective view of a rotary arm pivotally retained by a lengthwise base member of a fish hook remover in accordance with the present invention.
Figure 3:
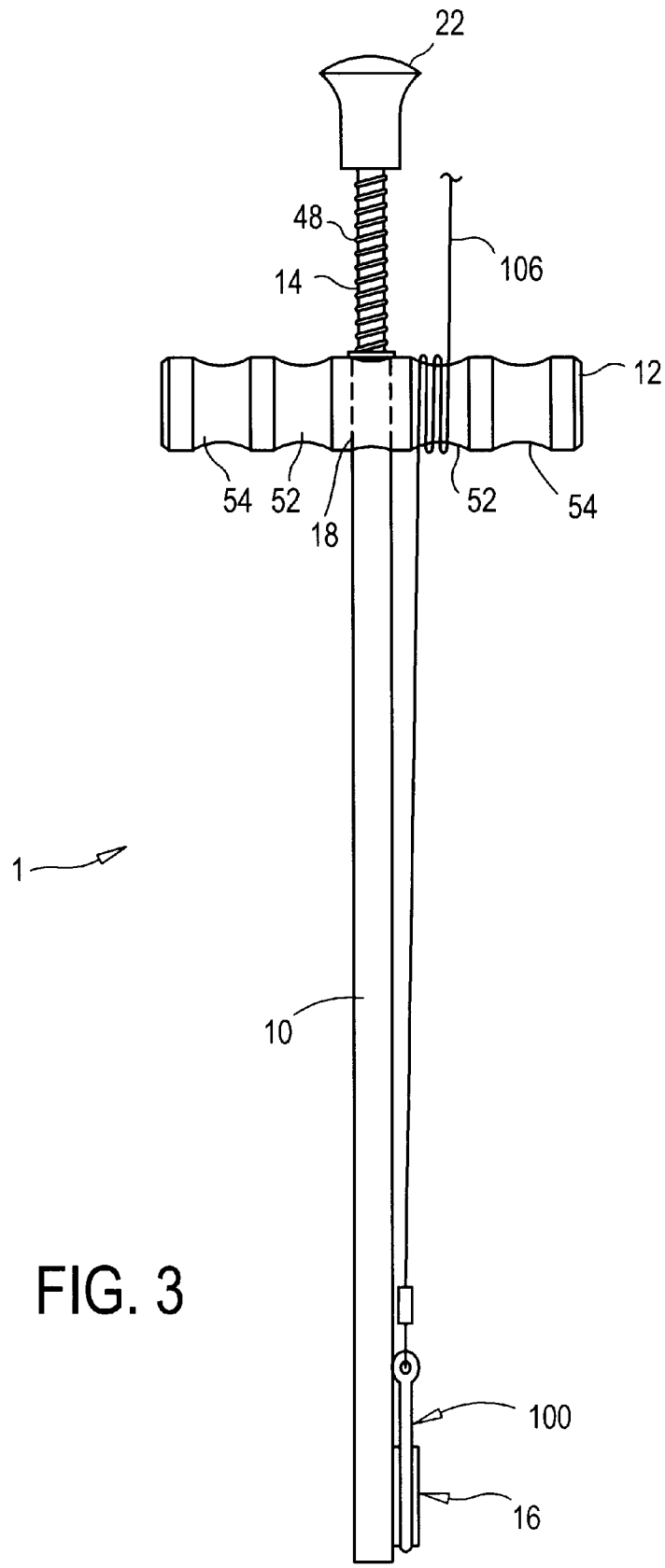
FIG. 3 is a front view of a rotary arm of a fish hook remover in accordance with the present invention.

With reference now to the drawings, and particularly to FIG. 1, there is shown a perspective view of a fish hook remover 1. With reference to FIGS. 2 and 3, the fish hook remover 1 includes a lengthwise base member 10, a combination handle 12, an actuation rod 14, and a rotary arm 16. A base member opening 18 is preferably formed in the combination handle 12 to receive one end of the lengthwise base member 10. The lengthwise base member 10 has a sufficient length to allow thereof to be inserted into the mouth of a large fish without the risk of the fisherman being bitten. The lengthwise base member 10 is disclosed as a round tube, but other cross sectional shapes may also be used, such as an "L" shape, a "U" channel or a square tube. A yoke 20 is formed on the other end of the lengthwise base member 10 to pivotal retain the rotary arm 16.

Figure 4:
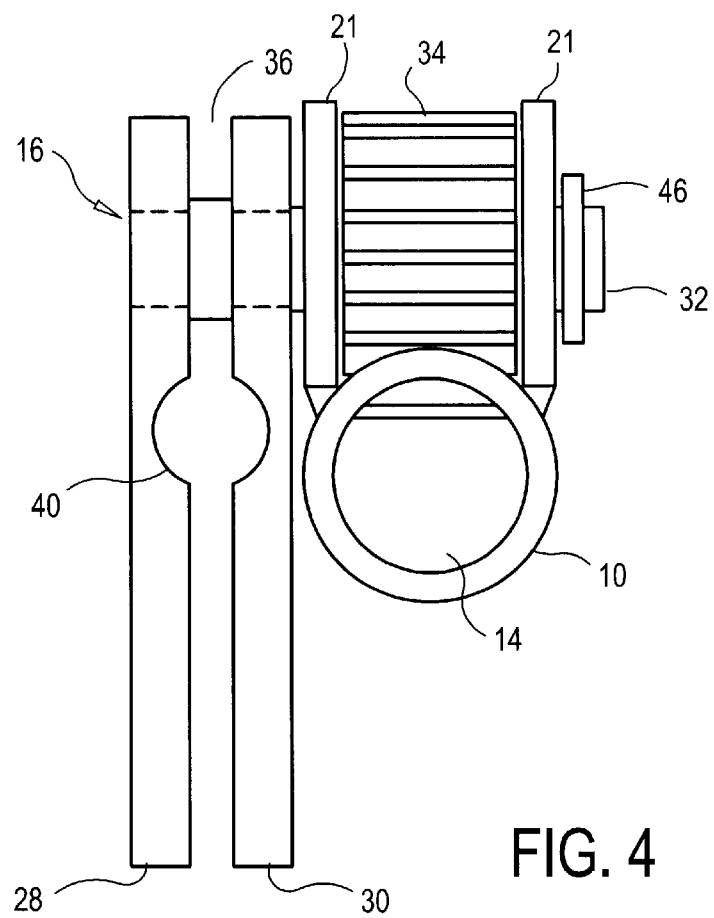
FIG. 4 is an enlarged end view of a rotary arm pivotally retained by a lengthwise base member of a fish hook remover in accordance with the present invention.
Figure 5:
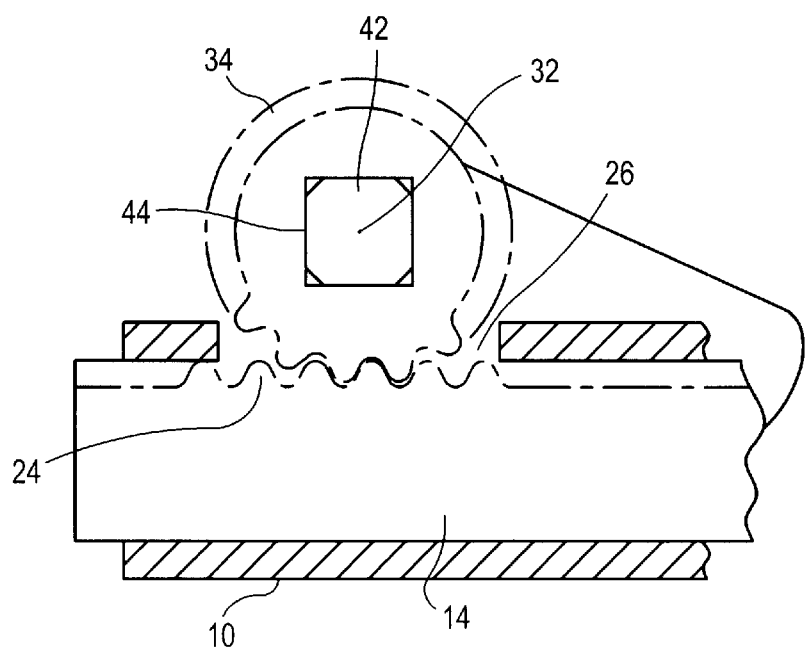
FIG. 5 is an enlarged cross sectional view of a pinion gear of a rotary arm engaged with a rack formed on an actuation rod of a fish hook remover in accordance with the present invention.
Figure 6A:
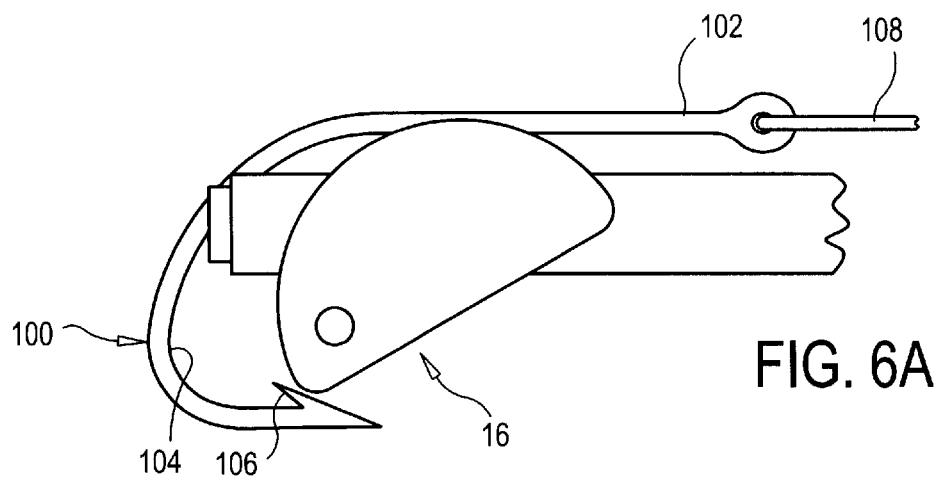
FIG. 6a is an enlarged side view of a rotary arm in a nonpivoted position of a fish hook remover in accordance with the present invention.
Figure 6B:
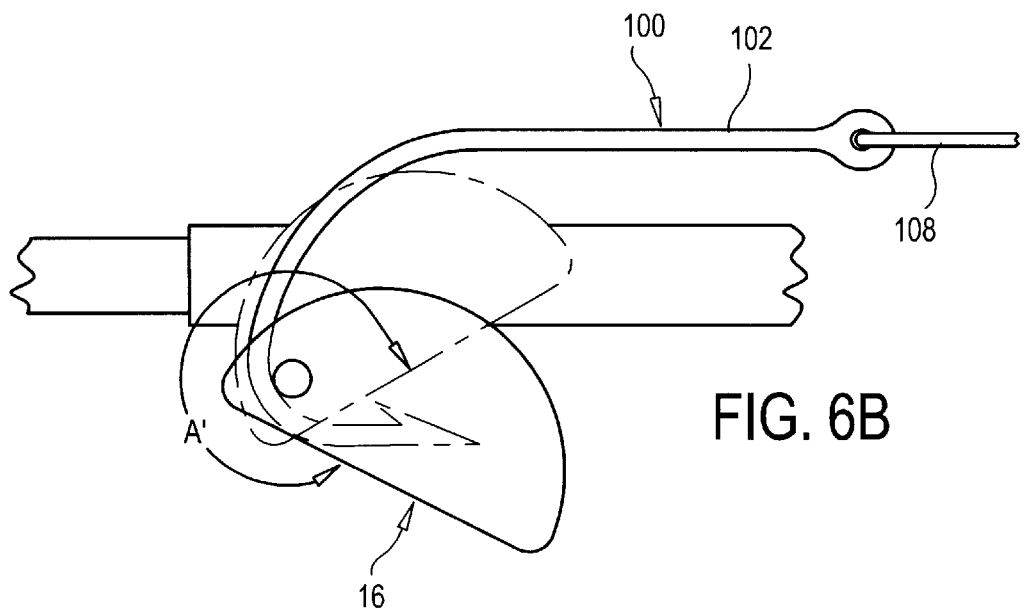
FIG. 6b is an enlarged side view of a rotary arm in a fully pivoted position of a fish hook remover in accordance with the present invention.

With reference to FIGS. 4 and 5, the actuation rod 14 is slidably retained by the lengthwise base member 10. In FIG. 4, the rotary arm 16 is rotated from its nonpivoted position. A knob 22 is attached to one end of the actuation rod 14 and a gear rack 24 is formed on the other end of the actuation rod 14. A gear opening 26 is formed through the lengthwise base member 10 between each ear 21 of the yoke 20 to expose the gear rack 24.

The rotary arm 16 includes a first rotating body 28, a second rotating body 30, a drive shaft 32, and a pinion gear 34. The first and second rotating bodies preferably have a substantially semi-circular shape. The first rotating body 28 is attached to one end of the drive shaft 32 and the second rotating body 30 is attached to the drive shaft 32, adjacent the first rotating body 28 such that a clearance area 36 is formed therebetween to receive a hook shank 102 of a fish hook 100. A leader clearance opening 40 is preferably formed through the first and second rotating bodies to provide clearance for a leader.

A male drive profile 42 is formed on the other end of the drive shaft 32 to receive a female drive profile 44 in the pinion gear 34. A square shaped drive profile is shown, but other shapes may also be used, such as a hex shape. The pinion gear 34 mates with the rack gear 24 formed on the actuation rod 14. The pinion gear 34 is axially retained between the two ears 21 of the yoke 20. The other end of the drive shaft 32 is inserted through the pinion gear 34 and both ears 21. A retention device 46 such as an "E" clip is attached to the other end of the drive shaft 32 to axially retain the drive shaft 32 relative to one of the ears 21. A compression spring 48 is preferably slipped over the actuation rod 14 and retained between the knob 22 and the combination handle 12.

In use, the clearance area 36 is slipped over the shank 102 of the fish hook 100 and the drive shaft 32 is pushed as close as possible to a bight 104 of the fish hook 100. The bight 104 is an inner curved surface, adjacent a barb 106 of the hook 100. A fishing line 108 is then preferably wrapped around an inner turned area 52 of the combination handle 12. An outer turned area 54 is preferably formed on substantially each end of the combination handle 12 for gripping by fingers. Next, a thumb is placed on the knob 22 and a single finger is placed around each outer turned area 54. The user squeezes the knob 22 toward the combination handle 12 with the thumb and fingers. As the actuation rod 14 is depressed, the gear rack 24 moves out of the lengthwise base member 10, which causes the pinion gear 34 to revolve the first and second rotating bodies an angle "A" of at least 90 degrees. However, other methods of pivoting the rotary arm 16 may also be used, besides the gear rack 24 and the pinion gear 34. The fish hook remover 1 is most effective when the rotary arm 16 is pivoted at least 180 degrees. Pivoting the rotary arm 16 pushes the flesh of the fish off the barb of the hook. The first and second rotating bodies cover the barb 106 and prevent the barb 106 from snagging the fish's mouth as the fish hook 100 is withdrawn.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A method of removing a fish hook with a barb from the mouth of a fish, comprising the steps of:

providing a rotary arm which receives the fish hook, forming a pinion gear on said rotary arm;

providing a base member which has a sufficient length for insertion into the mouth of the fish, a handle being attached to one end of said base member, said rotary arm being pivotally attached to the other end of said base member;

providing an actuation rod with a rack gear formed on one end thereof, said rack gear engaging said pinion gear;

inserting said rotary arm adjacent a bight of the fish hook;

pivoting said rotary arm at least 180 degrees from an initial starting position by axial movement of said actuation rod to strip said fish hook from the mouth of the fish; and withdrawing said rotary arm from the fish.

2. The method of removing a fish hook with a barb from the mouth of a fish of claim 1, further comprising the step of:

wrapping a fishing line attached to an end of the fish hook around said handle.

3. The method of removing a fish hook with a barb from the mouth of a fish of claim 1, further comprising the step of:

providing said rotary arm with a first rotating body and a second rotating body, a clearance area being formed between said first and second bodies for receiving the fish hook.

4. The method of removing a fish hook with a barb from the mouth of a fish of claim 3, further comprising the step of:

each said rotating body having a substantially semi-circular perimeter.

5. The method of removing a fish hook with a barb from the mouth of a fish of claim 3, further comprising the step of:

forming a clearance opening through said first and second rotating bodies.

6. The method of removing a fish hook with a barb from the mouth of a fish of claim 1, further comprising the steps of:

attaching a knob to the other end of said actuation rod.

7. The method of removing a fish hook with a barb from the mouth of a fish of claim 6, further comprising the step of;

placing a spring between said knob and said handle to bias said rotary arm to a nonpivoted position.

8. A method of removing a fish hook with a barb from the mouth of a fish, comprising the steps of:

providing a rotary arm which receives the fish hook, forming a pinion gear on said rotary arm;

providing a base member which has a sufficient length for insertion into the mouth of the fish, a handle being attached to one end of said base member, said rotary arm being pivotally attached to the other end of said base member;

providing an actuation rod with a rack gear formed on one end thereof, said rack gear engaging said pinion gear:

inserting said rotary arm adjacent a bight of the fish hook;

wrapping a fishing line attached to an end of the fish hook around said handle;

pivoting said rotary arm at least 180 degrees from an initial starting position by axial movement of said actuation rod to strip said fish hook from the mouth of the fish; and withdrawing said rotary arm from the fish.

9. The method of removing a fish hook with a barb from the mouth of a fish of claim 8, further comprising the step of:

providing said rotary arm with a first rotating body and a second rotating body, a clearance area being formed between said first and second bodies for receiving the fish hook.

10. The method of removing a fish hook with a barb from the mouth of a fish of claim 9, further comprising the step of:

each said rotating body having a substantially semi-circular perimeter.

11. The method of removing a fish hook with a barb from the mouth of a fish of claim 9, further comprising the step of:

forming a clearance opening through said first and second rotating bodies.

12. The method of removing a fish hook with a barb from the mouth of a fish of claim 8, further comprising the steps of:

attaching a knob to the other end of said actuation rod.

13. The method of removing a fish hook with a barb from the mouth of a fish of claim 12, further comprising the step of:

placing a spring between said knob and said handle to bias said rotary arm to a nonpivoted position.

\* \* \* \* \*